United States Patent [19]

Fisher

[11] 4,111,037
[45] Sep. 5, 1978

[54] BATHTUB DRAIN AND OVERFLOW TESTING APPARATUS

[76] Inventor: John T. Fisher, 421 Diamond St., San Francisco, Calif. 94114

[21] Appl. No.: 761,642

[22] Filed: Jan. 24, 1977

[51] Int. Cl.² .................................................. G01M 3/02
[52] U.S. Cl. .................................... 73/40.5 R; 4/191; 4/255
[58] Field of Search .................. 73/46, 40, 40.5 R; 4/172, 191, 198, 201, 208, 255, 256; 141/334; 138/109

[56] References Cited

U.S. PATENT DOCUMENTS

| 17,820 | 7/1857 | Holly | 417/550 |
|---|---|---|---|
| 2,988,755 | 6/1961 | Roland | 4/201 |
| 3,938,202 | 2/1976 | Greer | 4/255 |

FOREIGN PATENT DOCUMENTS 2,444,571  1/1976  Fed. Rep. of Germany .............. 4/255

*Primary Examiner*—Richard C. Queisser
*Assistant Examiner*—Joseph W. Roskos
*Attorney, Agent, or Firm*—Phillips, Moore, Weissenberger, Lempio & Majestic

[57] ABSTRACT

A testing apparatus includes a tubular portion, and a lateral generally trough-shaped portion, the apparatus being positionable so that the bottom of the tubular portion bears on the tub about the drain outlet, with the extended end of the lateral portion bearing on the tub under and on either side of the overflow outlet of the tub, whereupon water can be introduced into the apparatus from the tap of the tub.

7 Claims, 3 Drawing Figures

U.S. Patent    Sept. 5, 1978    4,111,037
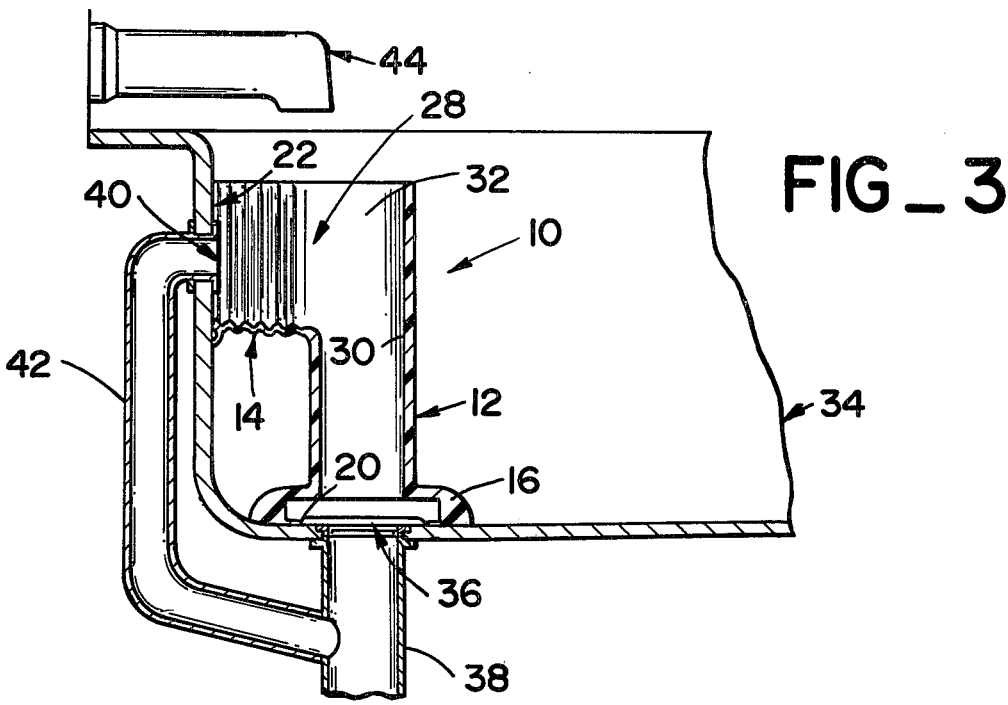
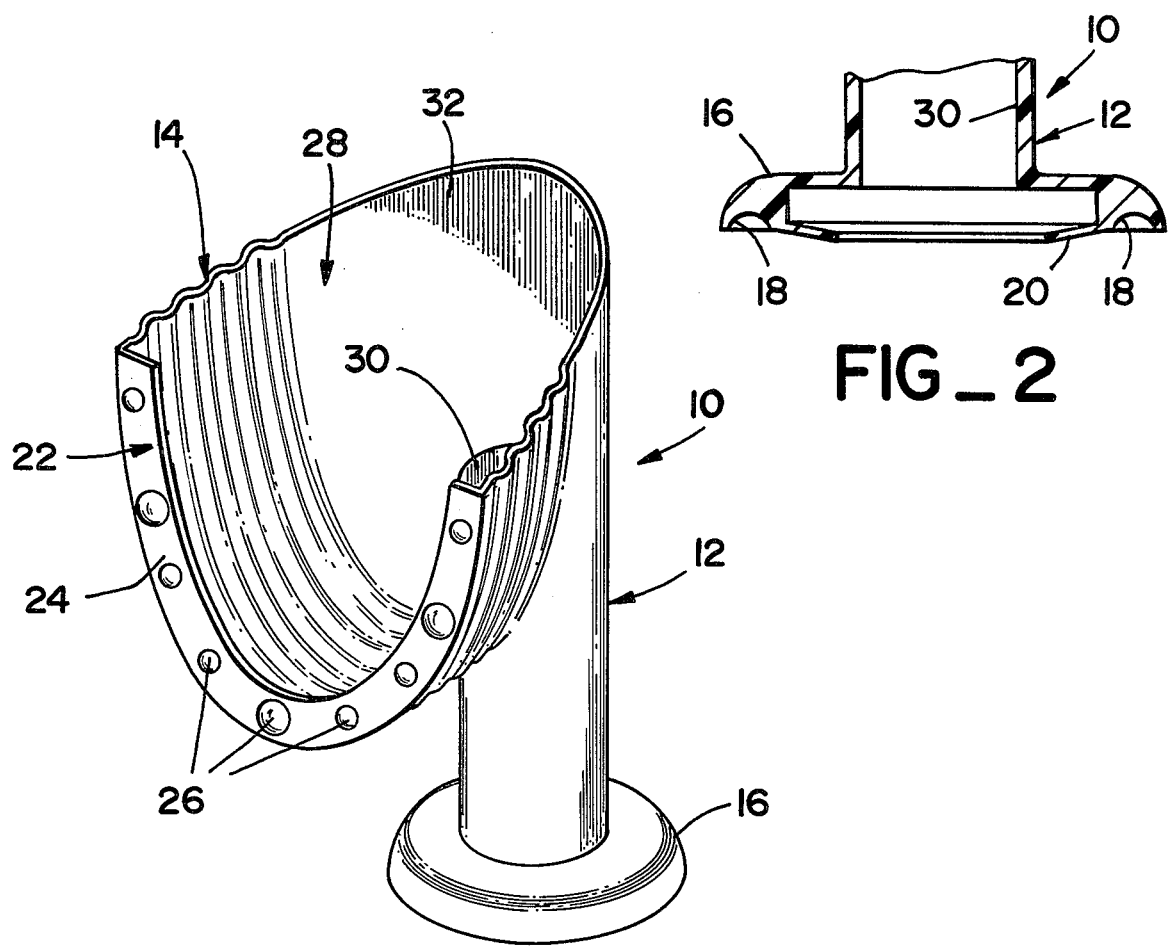

BATHTUB DRAIN AND OVERFLOW TESTING APPARATUS

BACKGROUND OF THE INVENTION

This invention relates to testing apparatus, and more particularly, to an apparatus for testing the plumbing of a bathtub.

In a conventional bathtub, there is included a drain outlet at the lowest point of the tub, which may be opened and closed as selected. There is also included an overflow outlet positioned adjacent the upper portion of the tub, the overflow outlet and drain outlet communicating with drain conduit means. In order to test the drain outlet, overflow outlet, and/or the drain conduit means of the tub, the drain outlet is closed, and the water tap is turned on until the tub is sufficiently full of water to reach the level of the overflow outlet, whereupon the operation of the overflow outlet and conduit means immediately associated therewith can be observed. During such process, the level of water is built up to a quite high level in the tub, providing that a relatively large head of water is placed on the drain outlet, so that leaking of the closed drain outlet can be observed. Furthermore, the drain outlet can then be opened so that proper operation thereof and of the conduit means immediately associated therewith can be observed.

It is to be noted that the proper testing of such outlets of the tub and the drain conduit means thereof requires that substantially the entire tub be filled with water. This is obviously a very time-consuming process for the person undertaking the test, and also requires a great amount of water each time a tub is to be tested.

Of general interest in this area are U.S. Pat. Reissue No. 19,771 to Crosbie, disclosing a receptacle which communicates with a drain through a tube, such receptacle and tube being permanently positioned to receive drippings from the faucets of the tub when they are in their closed positions. Also of general interest is U.S. Pat. No. 986,601 to Smith, which disclosed a shell in operative association with a faucet and drain, such shell acting as a siphon apparatus. Further of interest is U.S. Pat. No. 3,927,428, to Jette et al, disclosing an apparatus which may be adjusted for varying the overflow of water in a tub.

SUMMARY OF THE INVENTION

It is accordingly an object of this invention to provide apparatus which enables a person to test the drain outlet, overflow outlet, and drain conduit means associated therewith, of a tub in a highly efficient and convenient manner, without the necessity of substantially filling the tub with water.

It is a further object of this invention to provide apparatus which, while fulfilling the above object, is extremely simple in design and effective in use.

Broadly stated, the invention comprises a portable testing apparatus comprising a body defining passage means therethrough, the body being positionable so that the passage means communicate with the drain outlet of a tub, with the passage means being positioned to receive water from a tap of a tub.

BRIEF DESCRIPTION OF THE DRAWINGS

These and other objects of the invention will become apparent from a study of the following specifications and drawings, in which:

FIG. 1 is a perspective view of the present apparatus;
FIG. 2 is a sectional view of the lower portion of the apparatus; and
FIG. 3 is a sectional view of the apparatus in use for the testing of the drain outlet, the overflow outlet and the drain conduit means of a tub.

DESCRIPTION OF THE PREFERRED EMBODIMENT

Shown in FIG. 1 is the overall apparatus 10 for testing the drain and overflow means of a bathtub. As shown therein, the apparatus 10 includes two main portions, a tubular body portion 12, and a lateral portion 14. The tubular body portion 12 includes at the base thereof an annular flange 16 defining a plurality of suction cups 18 on the lower surface thereof and also defining an inwardly extending, downwardly biased annular lip 20. The lateral portion 14 extends from the tubular body portion 12 and is generally trough-shaped in configuration. The lateral portion 14 has an extended end 22, in fact having a flange 24 at the extended end 22 thereof which defines a plurality of suction cups 26. As shown in FIG. 1, the extended end 22 of the lateral portion 14 is generally U-shaped in configuration.

The inner area 28 of the lateral portion 14 communicates with the bore 30 of the tubular portion 12 as will also be seen in FIG. 1. The upper portion 32 of the apparatus 10 is open, the upper extending end of the apparatus 10 also being generally U-shaped in configuration.

The apparatus 10 is of flexible, resilient material, such as elastomeric material. The lateral portion 14 is corrugated or pleated in configuration substantially along its full length, so as to be extendable and retractable relative to the tubular portion 12 through tension and compression placed on the lateral portion 14 toward and away from the tubular portion 12.

Shown in FIG. 3 is a bathtub 34, including an openable and closable drain outlet 36 as well known, at the lowermost portion thereof. The drain outlet 36 communicates with a drain conduit 38. Also included is an overflow outlet 40 substantially above the lowermost level of the tub 34. A conduit 42 communicates the overflow outlet 40 with the drain conduit 38, so that water reaching the level of the overflow outlet 40 will flow therethrough through the conduit 42, and through the conduit 38. Also included is a water tap 44 which may be turned on and off as is well known to provide water flow into the tub 34, such water tap 44 being positioned slightly above the overflow outlet 40 of the tub 34.

In the use of the apparatus 10, the apparatus 10 is positioned as shown in FIG. 3, wherein the lowermost end of the tubular portion 12 bears on and is positioned about the drain outlet 36 of the tub 34, the suction cups 18 providing sealing relation between the tubular portion 12 and the tub 34 with the lip 20 aiding in providing sealing relation between the tubular portion 12, and the drain outlet 36. With the tubular portion 12 so positioned, the extending end 22 is in engagement with and bears on the tub 34, with such extending end 22 actually being positoned under and on either side of the overflow outlet 40 of the tub 34. The suction cups 26 of the extended end 22 of the lateral portion 14 provide sealing engagement of the extended end 22 with the tub 34, meanwhile with the corrugations of the lateral portion 14 allowing for a variation of the positioning of the drain outlet 36 and overflow outlet 40 from tub to tub being tested. Additionally, because the apparatus 10 is of flexible, resilient material, the apparatus 10 can be bent to an extent to further allow usage of the apparatus 10 even with a degree of variance of tubs to be tested.

It is to be seen that the top of the apparatus 10, and thus the area 28 and bore 30, are positioned to receive water from the tap 44.

With the apparatus 10 so positioned, the drain outlet 36 may be selectively closed, and the tap 44 turned on, whereby the water level in the apparatus 10 will quickly reach the level of the overflow drain 40, whereupon water will flow through the overflow drain 40 and through the conduit 42 to the conduit 38, whereby the operation of these systems can be readily observed. With the water level generally at such height, the head of water acting on the closed drain outlet 36 is as if the tub 34 were full of water as previously described, so that such closed drain outlet 36 can be readily tested for leakage. To test the full operation of the drain outlet 36, the outlet 36 need only be opened, whereupon water from the previously high level will exit from the tub 34 though the outlet drain 36 and through the conduit 38.

It will therefore be seen that the entire system including the drain outlet 36, overflow outlet 40, conduit 38 and conduit 42 can be easily and conveniently tested in a very rapid manner, using only the amount of water necessary to generally fill the apparatus 10 with water, rather than the whole tub 34. Thus, a very great saving in time and also in water is effected through the present apparatus.

What is claimed is:

1. A portable testing apparatus comprising a body defining passage means therethrough, the passage means having an inlet port and an outlet port, the body being positionable so that the outlet port of the passage means communicates with a drain outlet of a tub, with the inlet port of the passage means being positionable to receive water from a tap of a tub, and also to communicate with an overflow outlet of a tub, simultaneously, wherein the body is of flexible, resilient material.

2. The apparatus of claim 1 wherein the outlet port of the body is positionable to bear on a tub about a drain outlet of a tub.

3. The apparatus of claim 2 wherein the inlet port of the body is positionable to bear on a tub under and on either side of an overflow outlet of a tub.

4. A portable testing apparatus comprising a body defining passage means therethrough, the body being positionable so that the passage means communicate with a drain outlet of tub and also with an overflow outlet of a tub while also being positionable to receive water from the tap of the tub, and wherein a first portion of the body is positionable to bear on a tub about a drain outlet of a tub, and wherein a second portion of the body is positionable to bear on a tub under and on either side of an overflow outlet of a tub, said second portion also being simultaneously positionable under the tap of the tub, and wherein said second portion is corrugated in configuration so as to be extendable and retractable relative to the first portion.

5. The apparatus of claim 4 wherein the body is of flexible, resilient material.

6. A portable testing apparatus comprising a body comprising a tubular body portion, defining a bore, and a generally trough-shaped lateral portion extending from the tubular body portion and having an extending end, the inner area of the lateral portion communicating with the bore of the tubular body portion, the body being positionable so that (i) one end of the tubular body portion may be generally positionable about a drain outlet of a tub, with the bore of the tubular body portion communicating with a drain outlet and so that (ii) the extending end of the lateral portion is engageable with a tub under was on either side of an overflow outlet of a tub, and wherein with the body so positionable, the generally trough-shaped lateral portion is positionable to receive water from a tap of the tub, wherein the lateral portion is corrugated so as to be extendable and retractable relative to the tubular portion.

7. The apparatus of claim 6 wherein the body is of flexible, resilient material.

* * * * *

UNITED STATES PATENT OFFICE
CERTIFICATE OF CORRECTION

Patent No. 4,111,037     Dated September 5, 1978

Inventor(s) John T. Fisher

It is certified that error appears in the above-identified patent and that said Letters Patent are hereby corrected as shown below:

Column 1, line 41, "disclosed" should be --discloses--.

Column 4, line 34, "was" should be --and--.

Signed and Sealed this

Twenty-fourth Day of April 1979

[SEAL]

Attest:

RUTH C. MASON
Attesting Officer

DONALD W. BANNER
Commissioner of Patents and Trademarks